United States Patent
de Sousa et al.

(10) Patent No.: US 9,937,807 B2
(45) Date of Patent: Apr. 10, 2018

(54) BATTERY CHARGER, ELECTRICAL SYSTEM AND MOTOR VEHICLE

(71) Applicant: Valeo Systemes de Controle Moteur, Cergy Saint Christophe (FR)

(72) Inventors: Luis de Sousa, Eragny sur Seine (FR); Bruno Condamin, Pontoise (FR); Boris Bouchez, Cergy le Haut (FR); Pierre-Alexandre Chauvenet, Cergy (FR); Benedicte Silvestre, Vaux sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 176 days.

(21) Appl. No.: 15/099,983

(22) Filed: Apr. 15, 2016

(65) Prior Publication Data
US 2016/0303982 A1 Oct. 20, 2016

(30) Foreign Application Priority Data
Apr. 15, 2015 (FR) .................................... 15 53312

(51) Int. Cl.
H02J 7/00 (2006.01)
H02J 7/14 (2006.01)
(Continued)

(52) U.S. Cl.
CPC ......... B60L 11/182 (2013.01); B60L 11/1861 (2013.01); H02M 1/15 (2013.01);
(Continued)

(58) Field of Classification Search
USPC ....... 320/104, 107, 108, 103, 138, 162, 118, 320/145, 114; 363/17, 35, 142, 16, 53,
(Continued)

(56) References Cited

U.S. PATENT DOCUMENTS

2005/0088860 A1* 4/2005 Okuma .................. H02J 9/062
363/35
2011/0032733 A1* 2/2011 Watanabe ................. H02J 1/10
363/21.14
(Continued)

FOREIGN PATENT DOCUMENTS

CN 101685969 A 3/2010
FR 2991833 A1 12/2013

OTHER PUBLICATIONS

Search Report Issued in Corresponding French Application No. 1553312, dated Feb. 17, 2016 (9 Pages).

*Primary Examiner* — Alexis Pacheco
(74) *Attorney, Agent, or Firm* — Osha Liang LLP

(57) ABSTRACT

The battery charger comprises: two output terminals (BS1, BS2) between which a battery (102) is designed to be connected; two input terminals (BE1, BE2) designed to be connected to an electrical network (110); two inductors ($L_A$, $L_C$) respectively connected to the first input terminal (BE1) and to the second input terminal (BE2); two switching arms ($B_A$, $B_C$) for respectively connecting the inductors ($L_A$, $L_C$) selectively to the first output terminal (BS1) and to the second output terminal (BS2); a control device (120) designed for controlling the switching arms ($B_A$, $B_C$) so as to draw from the electrical network (110) a mains current ($i_R$) in phase with the mains voltage ($u_R$). The battery charger further comprises: a smoothing capacitor (C) connected to the second output terminal (BS2); and a connection device (112) for connecting the smoothing capacitor (C) to the second input terminal (BE2). The control device (120) is further designed to control at least the second switching arm (B.sub.C) so as to alternately charge and discharge the smoothing capacitor (C) for smoothing the load current ($i_B$).

10 Claims, 1 Drawing Sheet

(51) Int. Cl.
*B60L 11/18* (2006.01)
*H02M 1/15* (2006.01)
*H02M 1/42* (2007.01)

(52) U.S. Cl.
CPC ....... *H02M 1/4208* (2013.01); *H02M 1/4233* (2013.01); *Y02B 70/126* (2013.01)

(58) Field of Classification Search
USPC .............. 363/82, 84, 86; 307/43, 66, 72
See application file for complete search history.

(56) References Cited

U.S. PATENT DOCUMENTS

| | | | | |
|---|---|---|---|---|
| 2011/0176343 A1* | 7/2011 | Kojima | ................. | B60L 11/185 363/132 |
| 2011/0254512 A1* | 10/2011 | Nergaard | ................ | H02J 7/022 320/162 |
| 2013/0106365 A1* | 5/2013 | Ang | ..................... | B60L 3/0069 320/138 |
| 2014/0084862 A1* | 3/2014 | Kawaguchi | ........... | B60L 11/005 320/108 |
| 2014/0103860 A1* | 4/2014 | Kominami | .............. | H02M 1/32 320/103 |
| 2015/0102765 A1* | 4/2015 | Lee | ......................... | H02M 1/34 320/107 |

* cited by examiner

BATTERY CHARGER, ELECTRICAL SYSTEM AND MOTOR VEHICLE

TECHNICAL AREA

The present invention relates to a battery charger, in particular combined with an inverter in an electrical system.

The invention applies in particular to the field of electric motor vehicles.

In the description and the claims that follow, the term "connection" (and its derivatives, such as the word "connect") of electrical components include the case of a "direct" connection by an electrical conductor, as well as the case of an "indirect" connection, that is to say, through one or more other electrical components.

TECHNOLOGICAL BACKGROUND

The patent application published under number FR 2 991 833 A1 discloses a battery charger of the type comprising:
- two output terminals between which a battery is designed to be connected for receiving a load current,
- two input terminals designed to be connected to an electrical network to be supplied with a sinusoidal mains voltage,
- two inductors having first ends connected respectively to the first input terminal and to the second input terminal,
- two switching arms for selectively connecting second ends of the inductors respectively to the first output terminal and to the second output terminal,
- a control device for controlling the switching arm so as to draw from the electrical network a network current in phase with the mains voltage.

Such a battery charger includes therefore a Power Factor Corrector (PFC). The role of a power factor corrector is to absorb a current in phase with the mains voltage to minimize reactive power and maximize active power. However, the power supplied to the battery is not purely continuous but includes a sinusoidal component. Yet, in order to ensure proper charging of the battery and prevent premature wear of the latter, this sinusoidal component should preferably be eliminated. For this purpose, the battery charger of the previous publication comprises a smoothing capacitor for smoothing the load current supplied to the battery, and therefore the power supplied to the battery. This smoothing capacitor is connected between the second output terminal, corresponding to the negative battery terminal, and a third inductor, connected to the output terminals by a third switching arm. This third switching arm is designed to allow, by its switching, the charging and discharging of the smoothing capacitor which, when receiving the current, reduces the current supplied to the battery and, when restoring the current, increases the current supplied to the battery.

The invention aims to provide a battery charger capable of reducing losses.

SUMMARY OF THE INVENTION

To this end, there is provided a battery charger of the above type, characterized in that it further comprises:
- a smoothing capacitor having a first end connected to the second output terminal,
- a connection device for connecting a second end of the smoothing capacitor to the second input terminal, and in that, when the second end of the smoothing capacitor is connected to the second input terminal, the control device is also designed to control at least the second switching arm so as to alternately charge and discharge the smoothing capacitor to smooth the load current.

Thanks to the invention, the number of switching arms and inductors used for correcting the power factor and to smooth the load current can be reduced to only two. Thus, switching losses are reduced, and the absence of the third inductor reduces iron losses.

Optionally, the battery charger further comprises:
- a device for measuring the battery voltage,
- the connecting device is designed to take at least two states, the second end of the smoothing capacitor being connected to the second input terminal in one of the two states but not in the other, and the control device is for controlling the connection device according to the measured battery voltage to switch the connection device from one state to the other.

Thus, the battery charger can, depending on the battery voltage, select or not the second switching arm to smooth the load current.

Also optionally, the battery charger further comprises:
- a third inductor,
- a third switching arm for connecting a first end of the third inductor selectively to the first output terminal and to the second output terminal,
- the connecting device comprises a switch for connecting the second end of the smoothing capacitor selectively to the second input terminal and to a second end of the third inductor, and when the second end of the smoothing capacitor is connected to the second end of the third inductor, the control device is designed to control the third switching arm so as to alternately charge and discharge the smoothing capacitor for smoothing the load current.

Thus, it is possible to choose to use either the second switching arm or the third switching arm to smooth the load current.

Also optionally, the control device is for controlling the switch to connect the second end of the smoothing capacitor to the second input terminal when the battery voltage is above a threshold, and for controlling the switch to connect the second end of the smoothing capacitor to the second end of the third inductor when the battery voltage is below the threshold.

Indeed, when the battery voltage is too low compared to the mains voltage, it may not be possible to use the second switching arm to both correct the power factor and to smooth the load current. With the invention, the battery charger can detect the drop in battery voltage to use the third switching arm for smoothing the load current.

There is also provided an electrical system comprising:
- a battery charger according to the invention,
- a battery connected to the output terminals of the battery charger,
- an electric motor having three windings,
- an inverter connecting the battery to the electric motor, the inverter having six switching arms for respectively connecting the ends of windings selectively to the first output terminal and to the second output terminal.

Optionally, the first switching arm and the second switching arm of the battery charger are switching arms of the inverter.

Also optionally, the first inductor and the second inductor of the battery charger each comprises at least a portion of respectively the first winding and the second winding of the electric motor.

Also optionally, the third switching arm of the battery charger is a switching arm of the inverter.

Also optionally, the third inductor of the battery charger comprises at least a portion of the third winding of the electric motor.

Thus, with the previous four optional variants, a saving of components is achieved, which may allow a saving in cost and volume of the electrical system.

There is also provided a motor vehicle comprising an electrical system according to the invention, the electric motor being designed to drive the wheels of the motor vehicle.

DETAILED DESCRIPTION

In the figures, the ends of each of the electrical components (inductors and capacitor) detailed below are identified respectively by the symbol "1" indicating a first end of the electrical component, and the symbol "2" indicating a second end of the electrical component.

Figure 1:
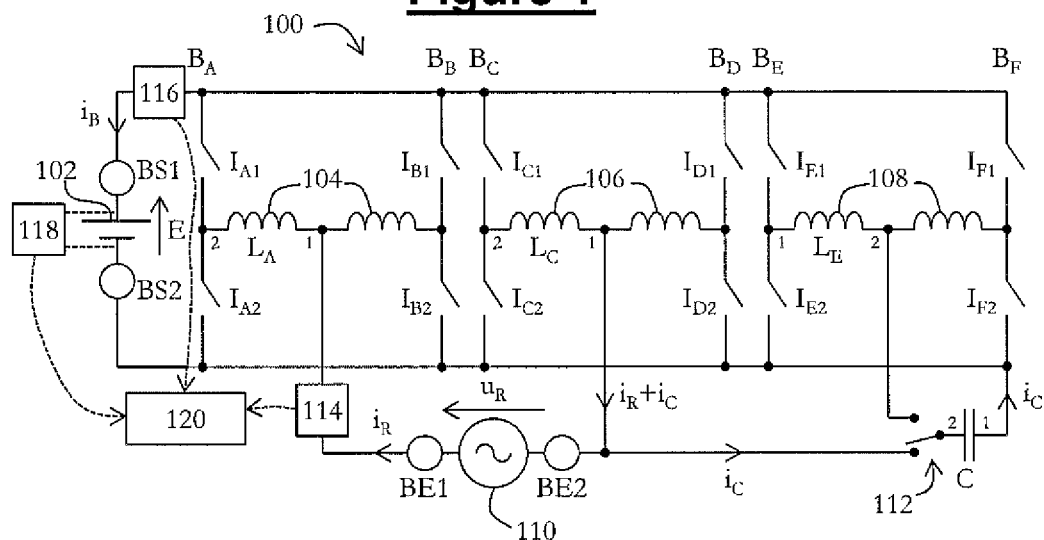
FIG. 1 is a circuit diagram of an electrical system embodying the invention.

Referring to FIG. 1, an electrical system 100 implementing the invention will now be described.

This electrical system 100 is, for example, designed to be installed in a motor vehicle.

The electrical system 100 comprises a first battery 102 having a negative terminal and a positive terminal and supplying between these terminals, a DC voltage E.

The electrical system 100 further comprises an electric motor having three windings 104, 106, 108.

The electrical system 100 further comprises an inverter connecting the battery 102 to the electric motor.

More specifically, the inverter comprises two terminals BS1, BS2, respectively connected to the positive terminal and to the negative terminal of the battery 102.

The inverter further includes six switching arms $B_A$ to $B_F$ for respectively connecting the ends of the windings 104, 106, 108 selectively to the terminal BS1 and to the terminal BS2. For example, the switching arm $B_A$ is designed to connect one end of the winding 104 to the terminal BS1 or the terminal BS2, depending on its state.

Each switching arm $B_A$ to $B_F$ includes two switches $I_{A1}$ and $I_{A2}$ to $I_{F1}$ and $I_{F2}$ connected to each other at a midpoint to which is connected the end of the winding 104, 106, 108 associated with that switching arm $B_A$ to $B_F$. The switches $I_{A1}$ and $I_{A2}$ to $I_{F1}$ and $I_{F2}$ of a same switching arm $B_A$ to $B_F$ are also respectively connected to the terminal BS1 and to the terminal BS2. For example, $I_{A1}$ and $I_{A2}$ of the switching arm $B_A$ are respectively connected to the terminal BS1 and to the terminal BS2.

Thus, according to the configuration of the switching arm $B_A$ to $B_F$, each winding 104, 106, 108 may be supplied with a zero voltage (the two ends of the winding are connected to the same terminal, negative or positive, of the battery 102), the voltage +E or the voltage −E. It is thus possible to vary the average voltages applied to the windings for rotating a rotor of the electric motor. The electric motor is, for example, designed for driving the wheels of the motor vehicle.

The electrical system 100 further includes a battery charger for charging the battery 104 from an electrical network 110 by providing a load current $i_B$ to the battery 102. The electrical network 110 is, for example, a single-phase network or a multiphase network, for example, three-phase. In this second case, the terminal BS2 is for example connected to the neutral of the electrical network 110, while the terminal BS1 is connected to one of the phases of the electrical network 110.

As will be apparent hereinafter, in the example described, the battery charger reuses some of the elements of the inverter and the electric motor.

Thus, the battery charger includes the first terminals BS1, BS2, called "output terminals" within the battery charger. As indicated above, the output terminals BS1, BS2 are connected respectively to the positive terminal and to the negative terminal of the battery 102 to provide the load current $i_B$ to the battery 102.

The battery charger 106 also includes two input terminals BE1, BE2 designed to be connected to the electrical network 110 to be supplied with a sinusoidal network voltage $u_B$. The connection is made, for example, through a connection method (not shown) for connection to the socket of an electrical network 110.

The battery charger 106 further comprises two inductors $L_A$, $L_C$ having first ends respectively connected to the input terminal BE1 and to the input terminal BE2. In the example described, the inductors $L_A$, $L_C$ each comprise at least a portion of respectively the winding 104 and the winding 106.

The battery charger 106 further includes two switching arms $B_A$, $B_C$ for respectively connecting second ends of the inductors $L_A$, $L_C$ selectively to the output terminal BS1 and to the output terminal BS2. Thus, the switching arm $B_A$ is designed to connect the input terminal BE1 selectively to the output terminal BS1 and to the output terminal BS2, each time through the inductor $L_A$. Similarly, the switching arm $B_C$ is designed to connect the input terminal BE2 selectively to the output terminal BS1 and to the output terminal BS2, each time through the inductor $L_C$.

The battery charger further comprises an inductor $L_E$ comprising at least a portion of the winding 108.

The battery charger further comprises the switching arm $B_E$ for connecting a first end of the inductor $L_E$ selectively to the output terminal BS1 and to the output terminal BS2.

The battery charger further includes a smoothing capacitor C having a first end connected to the output terminal BS2.

The battery charger further includes a connection device 112 for connecting a second end of the smoothing capacitor C at least to the input terminal BE2. In the example described, the connection device 112 is a switch 112 for connecting the second end of the smoothing capacitor C selectively to the input terminal BE2 and to a second end of the inductor $L_B$.

When the switch connects the second end of the smoothing capacitor C to the input terminal BE2, the switching arm $B_C$ is designed to connect the smoothing capacitor C selectively to the output terminal BS1 and to the output terminal BS2, each time through the inductor $L_C$. When the switch 112 connects the second end of the smoothing capacitor C to the second end of the inductor $L_E$, the switching arm $B_E$ is designed to connect selectively the smoothing capacitor C to the output terminal BS1 and to the output terminal BS2, each time through the inductor $L_E$.

The battery charger further includes a measuring device 114 of the mains current $i_R$, a measuring device 116 of the load current $i_B$ and a measuring device 118 of the battery voltage E.

The battery charger 106 further includes a control device 120 for controlling the switching arms $B_A$, $B_C$, $B_E$ and the switch 112, from measurements of the measuring devices 114, 116, 118.

Specifically, the battery charger is designed to operate alternately in two modes.

Figure 2:
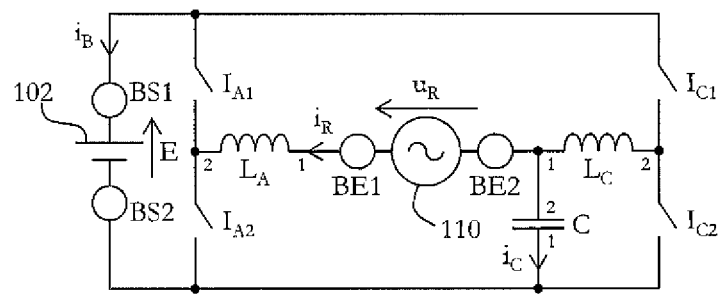
FIG. 2 is a circuit diagram of a battery charger of the electrical system of FIG. 1, in a first operating mode.

When the measured battery voltage E is above a threshold, the control device 120 switches the battery charger to a first operating mode. The wiring diagram of the battery charger in the first operating mode is illustrated in FIG. 2.

In the first operating mode, the control device 120 controls the switch 112 to connect the second end of the smoothing capacitor C to the input terminal BE2.

The control device 120 further controls the switching arms $B_A$, $B_C$ according to the measured mains current $i_R$, so as to draw from the electrical network 110 a mains current $i_R$ in phase with the mains voltage $u_R$. Thus, the power factor of the battery charger is increased so that it approaches 1.

The control device 120 further controls at least the switching arm $B_C$ (and preferably both switching arms $B_A$, $B_C$) according to the measured load current $i_B$, so as to alternately charge and discharge the smoothing capacitor C in order to smooth the load current $i_B$. The smoothing capacitor C is traversed by a smoothing current $i_C$ which, during the charge of the smoothing capacitor C, reduces the load current $i_B$, and during the discharge of the smoothing capacitor C, increases the load current $i_B$.

It will be appreciated that the switching arm BE is not used in the first operating mode. Only the two switching anus $B_A$, $B_C$ are used to correct the power factor and to smooth the load current $i_B$. This limits the number of switches, and therefore the losses due to switching operations, as well as the number of inductors, and therefore the iron losses.

Smoothing the load current $i_B$ reduces oscillations occurring at twice the frequency of the electrical network 110. For example, with an electrical network 110 frequency of 50 or 60 Hz, load current in oscillations would have a frequency of 100 or 120 Hz, respectively.

Figure 3:
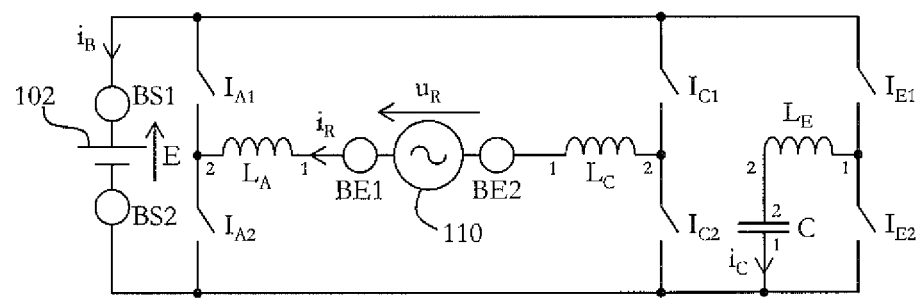
FIG. 3 is a circuit diagram of a battery charger of the electrical system of FIG. 1, in a second operating mode.

When the measured battery voltage E is below the threshold, the control device 120 switches the battery charger to a second operating mode. The wiring diagram of the battery charger in the second operating mode is illustrated in FIG. 3.

When the battery voltage E is measured below the threshold, the controller 120 switches the battery charger in a second mode of operation. The wiring diagram of the battery charger in the second operating mode is illustrated in FIG. 3.

In the second operating mode, the control device 120 controls the switch 112 to connect the second end of the smoothing capacitor C to the second end of the inductor $L_E$.

The control device 120 still controls the switching arms $B_A$, $B_C$ according to the measured mains current $i_R$, so as to draw from the electrical network 110 a mains current $i_R$ in phase with the mains voltage $u_R$.

However, this time, it is the switching arm $B_E$ that is controlled by the control device 120 according to the measured load current $i_B$, so as to alternately charge and discharge the smoothing capacitor C for smoothing the load current $i_B$.

Preferably, the threshold is greater than or equal to twice the peak voltage (that is to say, the maximum value) of the electrical network 110. The threshold is, for example, equal to twice the theoretical peak voltage plus 10%. Indeed, when the battery charger is in the first operating mode (FIG. 2), it is necessary for its proper operation that the voltage at the terminal BE1 always be lower than the battery voltage E (voltage at the terminal BS1). When switches $I_{A1}$ and $I_{C2}$ are closed while the switches $I_{A2}$ and $I_{C1}$ are open, the mains voltage $u_R$ and the voltage of the smoothing capacitor C are added together. Thus, to account for the worst case, it is necessary that the voltage E be greater than the sum of the peak voltage of the electrical network 110 and the peak voltage of the smoothing capacitor C. However, the peak voltage of the smoothing capacitor C is equal to the peak voltage of the electrical network 110. Thus, for the battery charger to operate in the first operating mode, it is necessary that the battery voltage E be greater than twice the peak voltage of the electrical network 110. For example, in Europe, the effective voltage is 240 V with possible overruns of up to 10%. Thus, the theoretical peak voltage of the mains voltage $u_R$ is equal to ($\sqrt{2}\times 240$)=339 V. Taking into account possible overruns, the peak voltage of the electrical network 110 is 339×110%=373 V. For the battery charger to function effectively in the first operating mode, it is therefore necessary that the battery voltage E be higher than the threshold of 373×2=746 V. If the battery voltage E falls below this threshold, for example because it is greatly discharged, it is best to switch to the second operating mode where the voltage of the smoothing capacitor C is never added to the mains voltage $i_R$.

The threshold for switching from one operating mode to the other is, for example, a predetermined fixed threshold.

Alternatively, the threshold depends on the mains voltage. In this case, for example, electrical system 100 further comprises a measuring device for measuring the amplitude of the network voltage $u_R$, for example the peak-to-peak mains voltage. The control device 120 is then designed to determine the threshold from the measurement. In particular, the control device 120 is designed for determining the threshold increases as the amplitude of the mains voltage is increasing.

The present invention is not limited to the embodiment described above, but is instead defined by the following claims. Indeed, it will be apparent to those skilled in the art that modifications can be made.

In particular, the battery charger may be designed to operate in the first operating mode, for example if it is determined that the risk of discharge of the battery E is very low. In this case, the connection device 112 may be a simple electrical connector connecting the smoothing capacitor C to the input terminal BE2. Still, in this case, the switching arm $B_E$ would not be used.

Furthermore, the terms used in the claims should not be understood as limited to elements of the embodiment described above, but instead must be understood as covering all equivalent elements that the skilled person may deduct from his general knowledge.

REFERENCES

Electric system 100
Battery 102
First winding 104
Second winding 106
Third winding 108
Electrical network 110
Connection device (switch) 112
Measuring device for the mains current 114
Measuring device for the load current 116
Measuring device for the battery voltage 118
Control device 120
Smoothing capacitor Smoothing current $i_C$
Mains voltage $u_R$
Mains current $i_R$
Battery voltage E
Load current $i_B$
Switching arm $B_A$ to $B_F$
Switches $I_{A1}$, $I_{A2}$ to $I_{F1}$, $I_{F2}$

The invention claimed is:

1. A battery charger, comprising:
two output terminals between which a battery is configured to be connected for receiving a load current;
two input terminals designed to be connected to an electrical network to be supplied with a sinusoidal mains voltage;
two inductors having first ends respectively connected to the first input terminal and to the second input terminal;
two switching arms designed for respectively connecting second ends of the inductors selectively to the first output terminal and to the second output terminal;
a control device designed for controlling the switching arms so as to draw from the electrical network a mains current in phase with the mains voltage;
a smoothing capacitor having a first end connected to the second output terminal; and
a connection device for connecting a second end of the smoothing capacitor to the second input terminal,
wherein, when the second end of the smoothing capacitor is connected to the second input terminal, the control device is further designed to control at least the second switching arm so as to alternately charge and discharge the smoothing capacitor for smoothing the load current.

2. The battery charger according to claim 1, further comprising:
a measuring device for measuring the battery voltage,
wherein the connection device is designed to take at least two states, the second end of the smoothing capacitor being connected to the second input terminal in one of the two states, but not in the other, and wherein the control device is designed to control the connection device according to the measured battery voltage for switching the connection device from one state to the other.

3. The battery charger according to claim 1, further comprising:
a third inductor;
a third switching arm for connecting a first end of the third inductor selectively to the first output terminal and to the second output terminal,
wherein the connection device comprises a switch for connecting the second end of the smoothing capacitor selectively to the second input terminal and to a second end of the third inductance,
and wherein, when the second end of the smoothing capacitor is connected to the second end of the third inductance, the control device controls the third switching arm so as to alternately charge and discharge the smoothing capacitor for smoothing the load current.

4. The battery charger according to claim 3, wherein the control device is for controlling the switch to connect the second end of the smoothing capacitor to the second input terminal when the battery voltage is greater than a threshold, and for controlling the switch to connect the second end of the smoothing capacitor to the second end of the third inductor when the battery voltage is below the threshold.

5. An electrical system comprising:
a battery charger according to claim 1;
a battery connected to the output terminals of the battery charger;
an electric motor having three windings; and
an inverter connecting the battery to the electric motor, the inverter having six switching arms for respectively connecting the six winding ends selectively to the first output terminal and to the second output terminal.

6. The electrical system according to claim 5, wherein the first switching arm and the second switching arm of the battery charger are the switching arms of the inverter.

7. The electrical system according to claim 5, wherein the first inductor and the second inductor of the battery charger each comprise at least a portion of respectively the first winding and the second winding of the electric motor.

8. The electrical system according to claim 5, wherein the battery charger further includes:
a third inductor;
a third switching arm for connecting a first end of the third inductor selectively to the first output terminal and to the second output terminal,
wherein the connection device comprises a switch for connecting the second end of the smoothing capacitor selectively to the second input terminal and to a second end of the third inductance,
wherein, when the second end of the smoothing capacitor is connected to the second end of the third inductance, the control device controls the third switching arm to alternately charge and discharge the smoothing capacitor for smoothing the load current, and,
wherein the third switching arm of the battery charger is a switching arm of the inverter.

9. The electrical system according to claim 5, wherein the battery charger further includes:
a third inductor;
a third switching arm for connecting a first end of the third inductor selectively to the first output terminal and to the second output terminal,
wherein the connection device comprises a switch for connecting the second end of the smoothing capacitor selectively to the second input terminal and to a second end of the third inductance,
wherein, when the second end of the smoothing capacitor is connected to the second end of the third inductance, the control device controls the third switching arm to alternately charge and discharge the smoothing capacitor for smoothing the load current, and,
wherein the third inductor of the battery charger comprises at least a portion of the third winding of the electric motor.

10. A motor vehicle comprising an electrical system according to claim 5, the electric motor being designed to drive the wheels of the motor vehicle.

* * * * *